INVENTORS
JOE E. PENICK
JOHN W. PAYNE
BY
John A. Crawley, Jr.
ATTORNEY

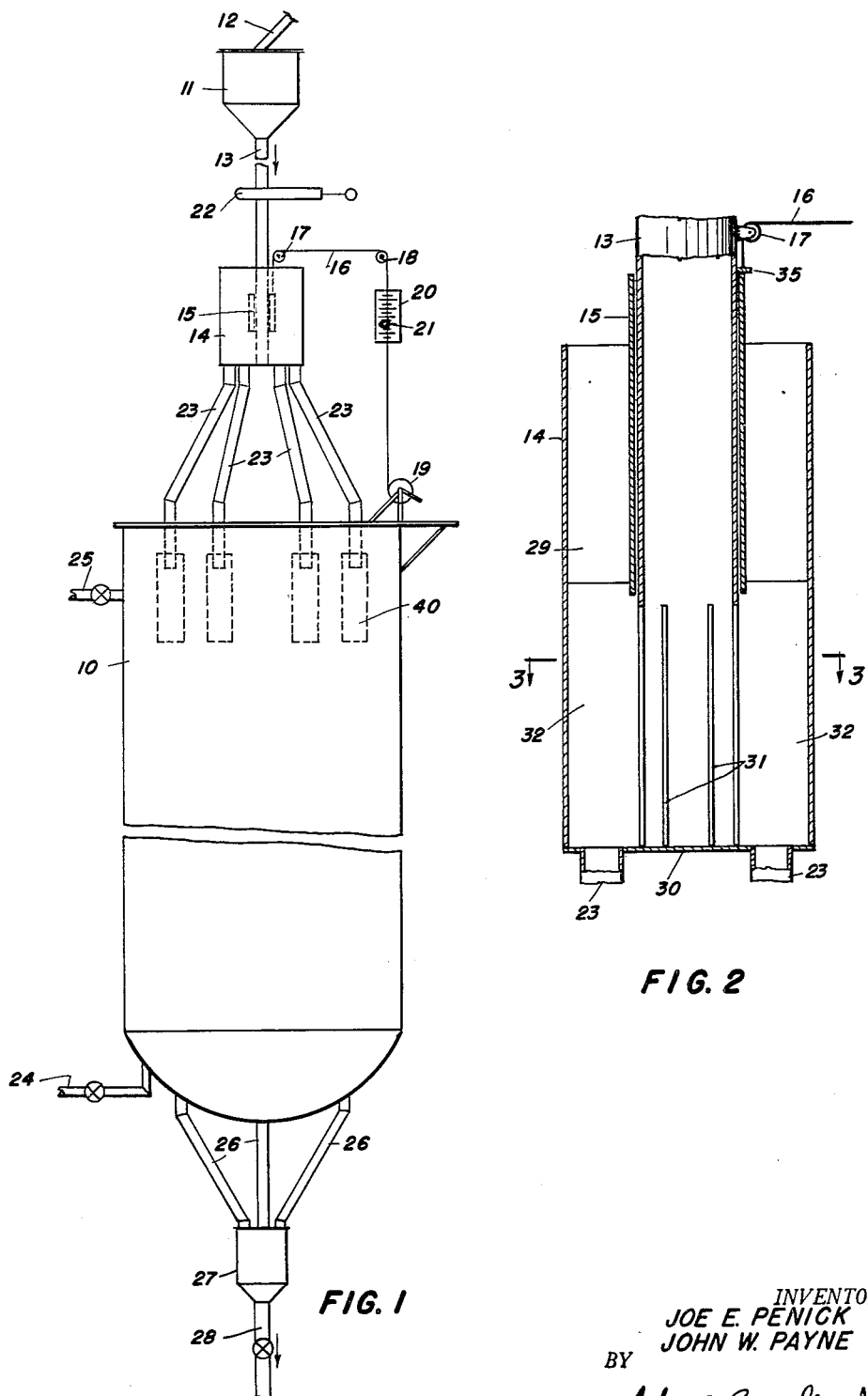

United States Patent Office 2,745,795
Patented May 15, 1956

2,745,795

APPARATUS FOR THE INTRODUCTION OF GRANULAR SOLIDS INTO A CLOSED VESSEL

Joe E. Penick and John W. Payne, Woodbury, N. J., assignors to Socony Mobil Oil Company, Inc., a corporation of New York Application July 17, 1951, Serial No. 237,264

10 Claims. (Cl. 196—147)

This invention has to do with an apparatus for introducing granular solids into a closed vessel and particularly with an apparatus for the introduction of the granular solids uniformly across a horizontal cross-section of the vessel. Typical of processes to which this invention may be applied is the continuous percolation of a liquid hydrocarbon stream through a downwardly flowing bed of granular adsorbent solids, such as fuller's earth, for the purpose of decolorizing the stream and removing impurities therefrom. Other exemplary processes in which this invention will find application are the catalytic cracking and reforming of hydrocarbons using a granular catalyst, and the thermal cracking, visbreaking or coking of hydrocarbons with a granular inert material.

In all of the above-mentioned processes, as well as numerous others, it is necessary that the bed of granular solids be substantially uniform in depth over the entire cross-sectional area of the vessel. Where the bed depth is not uniform, that portion of the hydrocarbon charge which passes through the shallower portions of the bed may not be sufficiently contacted, while the remainder, passing through the deeper portions of the bed, may be over-contacted, thereby yielding a non-uniform, inferior product. Unless the horizontal cross-sectional area of the contacting vessel is very small, introducing the granular contacting solids by means of a single central pipe is not desirable since the solids will form a large cone shaped pile beneath the central pipe due to the angle of repose of the granular solid. Thus, the depth of the bed of solids within the vessel is substantially less toward the outer edges of the bed than it is at the center of the bed. Where the granular solids are not all of the same size, as is the usual case, large piles of the granular material have the further disadvantage of particle size segregation, thereby causing non-uniform flow of the hydrocarbons through the bed of granular material.

This invention describes an apparatus for the introduction of granular solids to a closed vessel wherein the main stream of granular material to be introduced into the contacting vessel is split into a plurality of smaller streams which pass into the vessel and terminate at horizontally spaced apart points therein. The flow of granular material to these smaller streams is regulated by means of a variable closing member.

A major object of this invention is to provide an apparatus for the introduction of granular material into a closed vessel which overcomes the above-described difficulties.

A specific object of this invention is to provide an apparatus for the introduction of granular solids into the upper section of a closed vessel containing a substantially compact bed of said granular solids which insures that the bed will be of substantially the same depth across its entire horizontal cross-section.

These and other objects of the invention will become apparent from the following discussion.

Before proceeding with this discussion, certain terms used in describing and claiming this invention will be defined. The term "granular" is used herein to refer to material in the form of pellets, tablets, capsules or spheres, or granules of regular or irregular shape having a palpable particulate form as distinguished from finely divided powders. The term "annular" is not limited herein to ring-shaped openings or members of circular cross-section, but includes rectangular, triangular, hexagonal and the like shapes.

This invention may be best understood by referring to the attached drawings, of which:

Figure 1 is an elevational view showing the application of this invention to a continuous percolation process;

Figure 2 is an elevational view, partially in section, of a preferred form of the apparatus of this invention;

Figure 3:
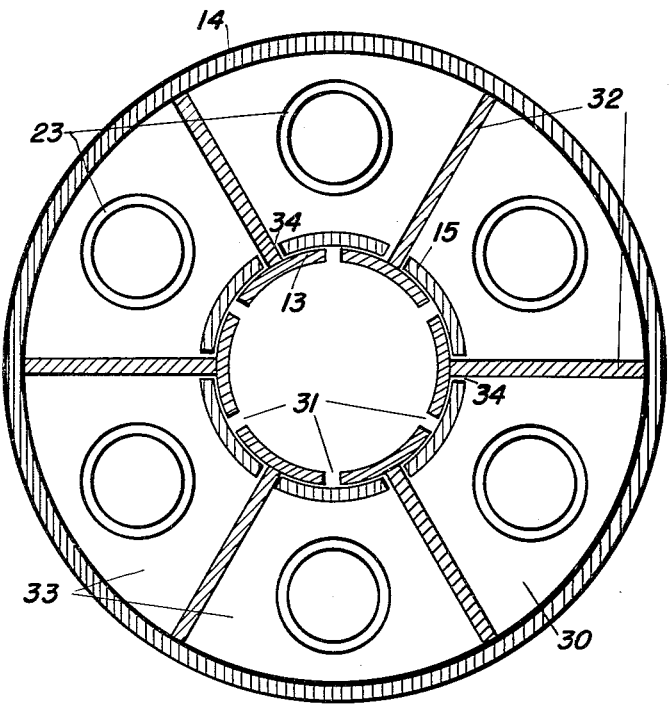
Figure 3 is a sectional view taken along line 3—3 of Figure 2.

All of these drawings are diagrammatic in form.

Turning first to Figure 1, there is shown a confined contacting vessel or treater 10 with a feed hopper 11 positioned centrally above its upper end. A conduit 12 for the supply of granular solids extends into the upper section of hopper 11. A conduit or pipe 13 extends centrally downwardly from the lower section of hopper 11 and terminates centrally above the upper end of vessel 10. Positioned about the lower section of conduit 13 is a second conduit 14 of larger cross-sectional area than conduit 13 so that an annular space is formed between the two. A sleeve 15 is fitted loosely and slidably about pipe 13. A cable 16 is attached to the upper end of sleeve 15 and passes over pulleys 17 and 18 to winch 19 whereby sleeve 15 may be raised and lowered and positioned at a variety of levels within conduit 14. A scale 20 in conjunction with a pointer 21 on cable 16 indicates the position of sleeve 15 on pipe 13. Other means of raising and lowering sleeve 15 than that shown are contemplated within the scope of this invention. A slide valve or full opening plug-type valve 22 is provided on conduit 13 above the upper end of conduit 14 so that the flow of granular solids from hopper 11 may be stopped. A plurality of conduits 23 extend downwardly from the annular space between conduits 13 and 14 and terminate within vessel 10 at the same vertical level but at horizontally spaced apart points on that level. Attached to the lower ends of conduits 23 are soaking devices 40, the function of which is to supply contact material to vessel 10 without substantial mixing with outgoing treated oil. Suitable soaking devices are described in U. S. patent application, Serial No. 237,268, filed July 17, 1951. Vessel 10 is provided with an inlet 24 for liquid hydrocarbon charge in its lower section. Suitable means (not shown) for distributing the liquid charge across the cross-section of vessel 10 may be provided in conjunction with conduit 24. A liquid product outlet 25 is provided near the upper end of vessel 10. A plurality of conduits 26 for the removal of granular solids extend downwardly from the lower section of vessel 10 and terminate within a common receptacle 27. A conduit 28 for withdrawal of granular solids extends downwardly from the lower section of receptacle 27.

In operation, the granular solids flow downwardly from hopper 11 through conduit 13 and flow into the annular space between conduits 13 and 14 by means of openings in conduit 13 (not shown in Figure 1). The granular solids used may be fuller's earth, bauxite, bone char, charcoal, activated carbon, or like absorbent materials. The granular solids are transferred into the upper section of vessel 10 by means of conduits 23. Since conduits 23 with soaking device 40 thereon terminates at a plurality of horizontally spaced apart points within the vessel, no large piles of granular solids will be formed and a substantially uniform bed depth of granular solids is maintained within contacting chamber 10. The granular solids pass through chamber 10 as a downwardly flowing bed. The liquid hydrocarbon charge passes into vessel 10 through conduit 24 and flows upwardly countercurrently to the downwardly flowing bed. This liquid charge may consist of a lubricating oil, a fuel oil, or other fraction of crude petroleum. In passing upwardly through the bed, the liquid hydrocarbon stream is decolorized and undesirable impurities are removed. Liquid hydrocarbon product is removed through conduit 25. Spent granular solids with color bodies and other impurities thereon are removed from chamber 10 through conduits 26 and transferred to receptacle 27 from which the solids pass by means of conduit 28. The solids may flow from conduit 28 to suitable washing, drying and revivification means. In general, the revivification is conducted in a kiln wherein the contaminants thereon are removed and the granular solids are restored to about their original condition. The solids may then be returned to hopper 11 by means of conduit 12. A continuous cyclic percolation process of the general type involved is disclosed and claimed in U. S. patent application, Serial Number 177,408, filed August 3, 1950.

Figures 2 and 3 show the details of the apparatus for distributing the granular solids uniformly across vessel 10, and like parts in both of these figures and Figure 1 bear the same numerals. In Figure 2, sleeve 15 is shown in its maximum upward position while in Figure 3 the sleeve is lowered. Both of these figures will be considered together. There is shown thereon circular pipe 13 with circular conduit 14 of greater diameter than conduit 13 positioned about the lower section of conduit 13 with its lower end lying in the same horizontal plane as the lower end of conduit 13. An annular space 29 is thereby defined between the outer wall of pipe 13 and the inner wall of conduit 14. A horizontal closing plate or partition 30 extends across the lower ends of conduits 13 and 14 and is tightly attached thereto. Spaced horizontally around the lower section of pipe 13 are a plurality of vertical slots 31 of substantially greater height than width. These slots extend upwardly from the bottom of 13 to a vertical level below the upper end of conduit 14. Slots 31 extend through the wall of pipe 13. A plurality of vertical partitions 32 extend radially outwardly from the outer wall of conduit 13 from positions centrally between slots 31 to the inner wall of conduit 14. Radial partitions 32 are tightly attached to the walls of conduits 13 and 14 and to closing plate 30 and extend upwardly to a vertical level above the upper end of slots 31 but below the upper end of conduit 14 so that a plurality of compartments, receptacles or receiving chambers 33 are formed within the lower section of annular space 29, each adapted to receive granular solids from conduit 13 by means of slots 31. Sleeve 15 is fitted loosely and slidably about pipe 13. In the lower section of sleeve 15 are a plurality of vertically extending open-ended slots or openings 34, one such slot being in alignment with each of partitions 32. Slots 34 should be greater in height and width than partitions 32 so that sleeve 15 may be lowered to the bottom of annular space 29. Sleeve 15 and partitions 32 should be of such a height that partitions 32 remain engaged in slots 34 when sleeve 15 is in its maximum upward position. However, sleeve 15 should not be so long that it cannot be raised completely above slots 31. A stop, protuberance or flange 35 is attached to pipe 13 so that sleeve 15 may not be raised so high that openings 34 will disengage from partitions 32. A plurality of conduits 23 extend downwardly from the lower section of annular space 29, one such conduit extending downwardly from each of compartments 33. These conduits terminate at the same vertical level but at horizontally spaced apart points on that level within vessel 10 as is illustrated in Figure 1. While conduits 13 and 14 are shown herein lying in the same plane with partition 30 closing off the lower ends of both conduits, this positioning of these parts is not necessary to this invention. The end of conduit 13 may lie in a plane above that in which the end of conduit 14 lies and partition 30 need not close off the end of conduit 13 tightly. It is necessary, however, that the end of conduit 13 be so close to partition 30 that contact material will not flow directly from the end of conduit 13 into conduits 23. Also, if pipe 13 is closed tightly, the lower ends of receptacles 33 may lie at a lower level than the lower end of pipe 13.

In operation, granular material passes from conduits 13 into compartments 33 through slots 31. Contact material is passed from receptacles 33 by means of conduits 23 into chamber 10. Sleeve 15 may be positioned at any desired level over the lower section of pipe 13 to throttle the flow of granular material through slots 13 and thereby throttle the flow of granular material to vessel 10.

Figure 4:
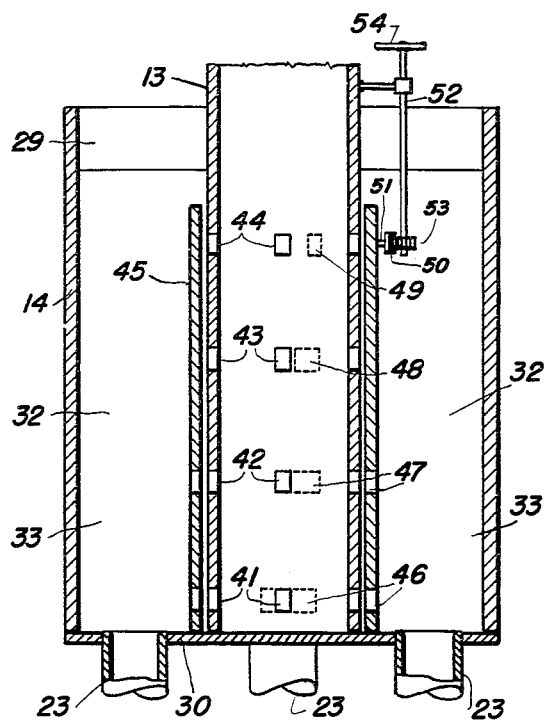
Figure 4 is an elevational view, partially in section, of a modification of this invention.

Figure 4 illustrates a modification of this invention and like parts in Figure 4 and the preceding figures bear the same numerals. In Figure 4, rather than employing a plurality of spaced apart slots in conduit 13, a plurality of vertically spaced apart rows of horizontally spaced apart apertures or orifices 41, 42, 43, and 44 are provided around the lower section of pipe 13. The apertures in pipe 13 are so positioned that one aperture in each row communicates with each of receiving chambers 33. A sleeve 45 is fitted loosely about the lower section of pipe 13 and passes freely through partitions 32. A plurality of vertically spaced apart rows of openings 46, 47, 48, and 49 pass through sleeve 45 at vertical levels the same as rows of orifices 41, 42, 43, and 44, respectively. The openings of rows 46, 47, 48, and 49 are so placed and of such a size that as sleeve 45 is rotated in either a clockwise or counterclockwise direction, as desired, openings 46 will first uncover openings 41. On further rotation, openings 47 will uncover openings 42, while openings 41 remain uncovered. Continued rotation will uncover 43 and finally 44, by means of 48 and 49 with all of the lower rows of orifices remaining uncovered. Thus, the flow of granular material from pipe 13 into compartments 33 may be set at any one of four different rates. Means for accomplishing the rotation of sleeve 45 are shown on Figure 4. A bow-shaped gear 50 is attached to the upper section of sleeve 45 by means of rod 51. A shaft 52 with gear 53 on its lower end extends into annular space 29. Gear 53 is positioned so as to operate gear 50. A hand wheel 54 is provided so that sleeve 45 may be rotated from the exterior. Other means than that shown may be provided within the scope of this invention.

Conduits 13 and 14 shown in the accompanying drawings as being circular in horizontal cross-sectional shape, may, within the scope of this invention, be of any other desired shape such as triangular, rectangular or hexagonal. Also, while it is preferable that 13 and 14 be of the same shape, this is not necessary within the broader scope of this invention. While it is preferable that the apparatus of this invention be above the upper end of the vessel, in its broader forms the apparatus may be situated entirely within the upper section of the vessel and feed to a bed of granular solids therebelow.

In no case should there be a horizontal distance greater than 8 feet from one of conduits 23 at its termination point to the nearest adjacent conduit 23. Preferably, this distance should be less than 4 feet. The total area of slots 31 should be such that the total flow capacity of granular solids through the slots is less than 75 per cent of the total flow capacity of pipe 13. This may be expressed by the following inequality:

$$NaAR^{0.5}\phi \log \frac{3.2R}{De} < 0.84 d^{2.5}(1-2.5a) \log\left(0.8\frac{d}{De}\right)$$

where $N$=number of slots 31, $a$=a constant dependent on the particular granular solid used, $A$=area of one slot 31 in square inches, $R$=the hydraulic radius of slot in inches=the area of one slot divided by its perimeter, $\phi$=correction for granule shape and roughness of the granular material, $De$=average particle diameter of the granular material in inches, and $d$=diameter of pipe 13 in inches. $N$ should lie within the range of about 2 to 20, $A$ should lie within the range about .01563 square inch to 8.0 square inches, $R$ should lie within the range about .0313 inch to 0.445 inch, $\phi$ should lie within the range about 0.15 to 1.0, $De$ should lie within the range about .0058 inch to 0.185 inch, and $d$ should lie within the range about .125 inch to 10 inches. For fuller's earth, $a$=0.27 and $\phi$=0.7. Preferably, the total flow capacity of the slots should be 25 per cent to 50 per cent of the flow capacity of the pipe. This invention may be used with granular solids broadly in the range about 4 to 100 mesh and preferably in the range 10 to 60 mesh and still more preferably in the range 15 to 30 mesh by Tyler Standard Screen Analysis.

In a satisfactory construction of the apparatus of this invention, pipe 13 was a 2-inch, Schedule 40 seamless steel pipe, conduit 14 was a one-foot 6-inch length of 6-inch, Schedule 40 seamless steel pipe. Closing plate 30 was a 6⅝-inch diameter steel plate, ¼-inch thick. There were 6 slots 31, ³⁄₁₆ inch by 10 inches in the lower section of pipe 13 and 6 vertical partitions 32, 11 inches high and made of No. 16 U. S. S. Gage steel sheet. Sleeve 15 was made of a 13½-inch piece of 2½ inch, Schedule 80 seamless pipe. Slots 34 in sleeves 15 were ¼ inch by 11 inches. Stop 35 was positioned 2 feet above the lower end of pipe 13 and was made of ¼-inch diameter bar stock, ¾ inches long. The six pipes 23 which were provided were one-inch, Schedule 40 pipe. These pipes terminated in six vertical soaking tubes which were of larger diameter than the pipes and open on both ends. The soaking tubes were spaced on 33-inch centers. This apparatus was used in conjunction with a contacting vessel having a diameter of 8 feet.

This invention should be understood to cover all changes and modifications of the example of the invention herein chosen for purposes of disclosure which do not constitute departures from the spirit and scope of the invention.

What is claimed is:

1. An apparatus for introducing granular material into a vessel which comprises in combination: a conduit for the passage of granular material, a second conduit of larger horizontal cross-sectional area than said first-named conduit placed concentrically about the lower section of said first-named conduit so that an annular space is defined between the outer wall of said first-named conduit and the inner wall of said second-named conduit, a horizontal partition closing off the lower ends of both of said conduits, a plurality of spaced apart vertical partitions extending radially acros sthe lower section of said annular space so as to form a plurality of compartments in the lower section of said annular space, at least one opening for the flow of granular material extending through the wall of said first-named conduit into each of said compartments whereby granular material will flow from said first-named conduit into said compartments, a sleeve fitted loosely and slidably about said first-named conduit, openings in said sleeve through which said vertical positions will pass when said sleeve is lowered, means for raising and lowering said sleeve along the lower section of said pipe and at least one conduit for granular material extending downwardly from each of said compartments into said vessel, the conduits from said compartments terminating at about the same vertical level within the vessel and at horizontally spaced apart points on said vertical level.

2. An apparatus for the introduction of granular material into a vessel which comprises in combination: a first conduit for the flow of granular material terminating above said vessel, a second conduit of larger horizontal cross-sectional area than said first conduit placed concentrically about said first conduit so as to define an annular space between the outer wall of said first conduit and the inner wall of said second conduit, the lower end of said first and second conduits terminating in the same horizontal plane, a horizontal closing plate closing off the lower ends of both of said conduits, a plurality of vertical partitions extending transversely across said annular space from a plurality of uniformly spaced apart points about the periphery of the outer wall of said first conduit to the inner wall of said second conduit, said horizontal partitions extending upwardly from said closing plate and terminating at a level beneath the upper end of said second conduit whereby a plurality of closed compartments is defined within the lower section of said annular space, a plurality of vertically extending spaced apart slots through the wall of the lower section of said first conduit, one such slot communicating with each of said compartments whereby granular material will flow from said first conduit into said compartments, a sleeve fitting loosely about said first conduit and capable of being moved vertically upwardly and downwardly to regulate the flow of granular material through said slots, said sleeve having vertical slots open at their lower ends in positions corresponding to that of said vertical partitions so that said sleeve may be lowered into said compartments, means for lowering and raising said sleeve, and a plurality of conduits for the passage of granular material, one conduit extending downwardly from the lower section of each of said compartments, said plurality of conduits terminating at about the same vertical level and at horizontally spaced apart points on said level within said vessel.

3. An apparatus for introducing granular solids into the upper end of a closed vessel which comprises in combination: a pipe for the passage of granular solids terminating centrally above said vessel, a conduit of substantially greater horizontal cross-sectional area than said pipe placed concentrically about the lower section of said pipe so as to define an annular space between the outer wall of said pipe and the inner wall of said conduit, the lower end of said conduit lying in the same horizontal plane as the lower end of said pipe, a horizontal plate closing off the lower ends of said pipe and said conduit, a plurality of spaced apart vertical partitions extending transversely across said annular space from said pipe to said conduit, the lower end of said partitions abutting said horizontal plate whereby a plurality of closed compartments are formed in said continuous space, a plurality of vertically extending slots, extending upwardly from the bottom of said pipe to a level below the upper end of said conduit, one of said slots being in communication with each of said compartments, a sleeve fitting loosely and slidably about said pipe, slots open at their lower ends in said sleeve in alignment with said vertical partitions so that said sleeve may be lowered to close off communication between said pipe and said compartments through said slots, means for adjusting the height of said sleeve, and a plurality of conduits, one extending downwardly from the lower section of each of said compartments, said conduits terminating within said vessel at spaced apart points a distance of less than 4 feet one from the other.

4. An apparatus for introducing granular solids into a closed vessel which comprises in combination: a conduit for the passage of granular solids terminating centrally above the upper end of said vessel, a second conduit of substantially greater horizontal cross-sectional area than said first conduit fixed about the lower section of said first conduit with its lower end lying in the same horizontal plane as said first conduit so as to define an annular space between said first and second conduits, a closing plate extending across the lower ends of said first and second conduits, a plurality of spaced apart vertical slots through said first conduit extending upwardly from the bottom of said first conduit to a vertical level below that in which the upper end of said second conduit lies, said slots being of such a size and number that the total flow capacity of the slots is less than 75 per cent of the total flow capacity of said first conduit, a plurality of spaced apart vertical partitions extending laterally across said annular space from positions on said first conduit centrally between said slots, said partitions being tightly attached to the outer wall of said first conduit and the inner wall of said second conduit and to said closing plate and extending upwardly to a vertical level above said slots but below the lower end of said second conduit whereby a plurality of compartments are formed in the lower section of said annular space, a sleeve fitted loosely and slidably about said first conduit, vertically extending slots in said sleeve of greater height and width than said partitions and in alignment with said partitions, means to raise and lower said sleeve and to maintain said sleeve in any vertical position on said pipe from said closing plate to the upper end of said slots, a plurality of conduits, one of said conduits extending centrally downwardly from the lower section of each of said compartments into the upper section of said vessel, said conduits terminating within said vessel at horizontally spaced apart points less than 4 feet apart.

5. An apparatus for introducing granular material into a closed vessel which comprises in combination: a pipe terminating centrally above said vessel, means for supplying contact material to said pipe, a conduit of substantially greater horizontal cross-sectional area than said pipe positioned about said pipe with the lower end of said conduit in the same horizontal plane as the lower end of said pipe whereby an annular space is formed between said pipe and said conduit, a closing plate extending horizontally across the lower ends of said pipe and said conduit, a plurality of vertically extending slots of the same size and shape passing through the wall of said pipe at horizontally spaced apart positions, said slots being substantially less in width than in height and extending upwardly from the bottom of said pipe to a vertical level below the upper end of said conduit, the relationship between the size and number of said slots and the size of said pipe being as follows:

$$NaAR^{0.5}\phi \log \frac{3.2R}{De} < 0.84d^{2.5}(1-2.5a) \log \left(0.8\frac{d}{De}\right)$$

where $N$=number of slots within the range about 2 to 20, $a$=a constant dependent on the particular granular material being used within the range about 0.167 to 0.300, $A$=area of one slot in square inches within the range about .01563 square inch to 8.0 square inches, $R$=the hydraulic radius of one slot=the area of the slot divided by its perimeter within the range about .0313 inch to 0.445 inch, $\phi$=correction factor for particle shape and surface roughness of the granular material within the range about 0.15 to 1.0, $De$=average particle diameter of the granular material in inches within the range about .0058 inch to 0.185 inch and $d$=diameter of the pipe in inches within the range about 0.125 inch to 10 inches, a plurality of vertical partitions extending radially outwardly from positions centrally between said slots, said partitions being tightly attached to said closing plate and said pipe and conduit and extending upwardly to a vertical level above said slots but below the upper end of said conduit whereby said annular space is divided into a plurality of compartments in its lower section, a sleeve fitted loosely and slidably about said pipe, openings extending upwardly from the lower end of said sleeve of greater width and height than said partitions, said openings being of the same number as said partitions and lying directly above said partitions, a mechanism attached to the upper end of said sleeve whereby said sleeve may be raised and lowered and the lower end of said sleeve maintained at any vertical level between said closing plate and the upper ends of said slots, and a plurality of conduits, one of said conduits extending downwardly from the lower section of each of said compartments into said vessel, said conduits terminating at horizontally spaced apart points within the upper section of said vessel.

6. An apparatus for continuously contacting liquid hydrocarbons and adsorbent granular solids which comprises in combination: an enclosed contacting chamber, means for introducing liquid hydrocarbons into the lower section of said chamber, means for removing liquid hydrocarbons after the contacting from said chamber, a pipe terminating centrally above said chamber, means for supplying adsorbent granular solids to said pipe, a conduit of greater lateral dimensions than said pipe positioned around said pipe so that the lower end of said conduit lies in same horizontal plane as the lower end of said pipe, a horizontal closing plate extending across the lower ends of said pipe and said conduit and tightly attached thereto, a plurality of horizontally spaced apart vertical slots of equal dimensions and of substantially less width than height in said pipe, said slots extending upwardly from the bottom of said pipe to a vertical level below the upper end of said conduit, the relation between the size and number of said slots and the size of said pipe being as follows:

$$NaAR^{0.5}\phi \log \frac{3.2R}{De} < 0.84d^{2.5}(1-2.5a) \log \left(0.8\frac{d}{De}\right)$$

where $N$=number of slots within the range about 2 to 20, $a$=a constant dependent on the particular granular material used within the range about 0.167 to 0.300, $A$=area of one slot in square inches within the range .01563 square inch to 8.0 square inches, $R$=hydraulic radius of one slot=the area of the slot divided by its perimeter within the range about 0.0313 inch to 0.445 inch, $\phi$=correction factor for particle shape and roughness of the granular material within the range about 0.15 to 1.0, $De$=average particle diameter of the granular material in inches within the range about .0058 inch to 0.185 inch, and $d$=diameter of the pipe in inches within the range about 0.125 inch to 10 inches, a plurality of spaced apart vertical partitions extending radially outwardly from positions on the outer wall of said pipe centrally between said slots to the inner wall of said conduit, said partitions being tightly attached to said closing plate on their lower ends and extending upwardly to a level above the upper ends of said slots but below the upper end of said conduit so as to divide the lower section of said annular space into a plurality of compartments, a plurality of conduits extending downwardly from the lower section of said annular space into the upper section of said chamber, one of such conduits extending downwardly from the lower section of each of said compartments and said conduits terminating at the same vertical level within said chamber but at horizontally spaced apart points, there being a distance of less than 4 feet from any one conduit to the nearest adjacent conduit and means for removing granular material from the lower section of said chamber.

7. An apparatus for introducing granular solids into a closed vessel which comprises in combination: a pipe for the supply of granular material terminating centrally above the upper end of said vessel, a conduit of greater horizontal cross-sectional area than said pipe positioned about the lower section of said pipe so that the lower end of said conduit lies in the same horizontal plane as the lower end of said pipe whereby an annular space is formed between said pipe and said conduit, a horizontal closing plate across the lower end of said pipe and said conduit, a plurality of horizontally spaced apart vertical slots of substantially greater height than width through the wall of said pipe and extending upwardly from the lower end of said pipe to a vertical level below the upper end of said conduit, said slots being of such a size and number that the total flow capacity of said slots is within the range about 25 per cent to 50 per cent of the total flow capacity of said pipe, a plurality of vertical partitions extending radially outwardly from positions on the outer wall of said pipe centrally between said slots to the inner wall of said conduit, said partitions being tightly attached to said wall and said pipe and to said closing plate and extending upwardly to a vertical level above said slots but below the upper end of said conduit whereby a plurality of compartments are formed within the lower section of said annular space, a sleeve fitted loosely and slidably about said pipe, openings in the lower section of said sleeve of greater height and width than said partitions and in alignment with said partitions whereby said sleeve may be lowered to the bottom of said annular space, means for raising and lowering said sleeve and for maintaining said sleeve in any vertical position from the lower to the upper ends of said slots, and a plurality of conduits extending downwardly from the lower section of said annular space and terminating within said vessel, one such conduit extending downwardly from each of said compartments, said conduits terminating at about the same level within said vessel but at horizontally spaced apart points on said level.

8. An apparatus for the treatment of liquids with a solid granular material which comprises: a treater vessel, a feed pipe for granular material terminating above said vessel with a closure on its lower end, a plurality of apertures at spaced apart points around said feed pipe, a slidable closure device associated with each aperture adapted to close the aperture to any desired extent, receiving chambers associated with said apertures adapted to separately catch granular solids escaping from said pipe through said apertures, and a separate pipe from each receiving chamber extending into the upper section of the treater vessel, all such pipes terminating at spaced apart points on the same level.

9. An apparatus for introducing granular solids into a vessel which comprises in combination: a feed pipe terminating above said vessel having a closure on its lower end, a plurality of orifices distributed along the length and around the circumference of said feed pipe, receptacles spaced around said pipe, a fixed group of said orifices being in communication with each of said receptacles, a sleeve fitting slidably about said pipe and having openings therethrough so positioned and of such a size that when said sleeve is rotated an increasing number of orifices in each group is uncovered and contact material flows therethrough into said receptacles, means for rotating said sleeve to cover and uncover said orifices, and a pipe from each of said receptacles extending into the top of said vessel, all of said pipes terminating at spaced apart points on the same level.

10. An apparatus for introducing granular solids into a closed vessel which comprises in combination: a feed pipe terminating centrally above said vessel, a conduit of greater lateral dimensions than said pipe positioned concentrically about the lower section of said pipe so that the lower end of said conduit lies in the same plane as the lower end of said pipe whereby an annular space is formed between said conduit and said pipe, a closure extending across the lower ends of said pipe and said conduit and tightly attached thereto, a plurality of horizontally spaced apart vertical partitions extending across said annular space so as to divide said annular space into a plurality of compartments, a plurality of vertically spaced apart rows of horizontally spaced apart orifices, at least one orifice in each row being in communication with each of said compartments, a sleeve fitting loosely about said pipe and having openings therethrough so positioned and of such a size that as the sleeve is rotated said rows of orifices are uncovered one at a time, those rows previously uncovered remaining uncovered as the sleeve rotates, means for rotating said sleeve, and a separate pipe extending downwardly from each of said compartments and terminating within the upper section of said vessel, all such pipes terminating at spaced apart points on the same level within the vessel.

References Cited in the file of this patent

UNITED STATES PATENTS

| 440,634 | Holt | Nov. 18, 1890 |
| 1,514,330 | Neal et al. | Nov. 4, 1924 |
| 1,670,203 | Moller | May 15, 1928 |
| 1,743,394 | Rhoades | Jan. 14, 1930 |
| 1,759,877 | Wynne | May 27, 1930 |
| 1,941,499 | Siems | Jan. 2, 1934 |
| 2,482,138 | Schutte | Sept. 20, 1949 |
| 2,528,537 | Monnik et al. | Nov. 7, 1950 |
| 2,559,876 | Hoekstra | July 10, 1951 |
| 2,562,903 | Fontana | Aug. 7, 1951 |
| 2,596,610 | Shabaker | May 13, 1952 |

FOREIGN PATENTS

| 34,715 | Switzerland | July 18, 1905 |